(12) United States Patent
Oh et al.

(10) Patent No.: US 9,182,263 B2
(45) Date of Patent: Nov. 10, 2015

(54) LEVEL GAUGE

(75) Inventors: Hyun-Sub Oh, Changwon-si (KR);
Young-Mo Joo, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 195 days.

(21) Appl. No.: 13/997,434

(22) PCT Filed: Dec. 28, 2010

(86) PCT No.: PCT/KR2010/009400
§ 371 (c)(1),
(2), (4) Date: Jun. 24, 2013

(87) PCT Pub. No.: WO2012/091190
PCT Pub. Date: Jul. 5, 2012

(65) Prior Publication Data
US 2013/0291634 A1   Nov. 7, 2013

(51) Int. Cl.
*G01F 23/00* (2006.01)
*G01F 23/04* (2006.01)
*G01F 23/16* (2006.01)

(52) U.S. Cl.
CPC ............... *G01F 23/00* (2013.01); *G01F 23/04* (2013.01); *G01F 23/045* (2013.01); *G01F 23/162* (2013.01)

(58) Field of Classification Search
None
See application file for complete search history.

(56) References Cited

U.S. PATENT DOCUMENTS

| | | | |
|---|---|---|---|
| 1,864,138 A | 6/1932 | Machonis | |
| 3,377,708 A | 4/1968 | Gassman et al. | |
| 3,885,317 A | 5/1975 | Karls | |
| 4,572,097 A * | 2/1986 | Chapelsky | 116/227 |
| 5,113,594 A * | 5/1992 | Ishihara et al. | 33/722 |
| 5,613,303 A | 3/1997 | Kayano et al. | |
| 6,065,336 A * | 5/2000 | Liang | 73/305 |
| 6,185,994 B1 * | 2/2001 | Liang | 73/114.56 |
| 2007/0170186 A1 | 7/2007 | Bertani | |
| 2010/0095547 A1 * | 4/2010 | Armistead | 33/722 |
| 2010/0139109 A1 * | 6/2010 | Armistead | 33/727 |
| 2011/0061254 A1 * | 3/2011 | Armistead | 33/725 |

FOREIGN PATENT DOCUMENTS

| | | |
|---|---|---|
| FR | 2818373 A3 | 6/2002 |
| JP | 04-059315 U | 5/1992 |
| JP | 04-117126 U | 10/1992 |
| JP | 04-117128 U | 10/1992 |
| JP | 08-029234 A | 2/1996 |
| JP | 08247821 A * | 9/1996 |
| JP | H0910565 A | 1/1997 |

(Continued)

OTHER PUBLICATIONS

International Search Report (in Korean and English) and Written Opinion (in Korean) for PCT/KR2010/009400, mailed Aug. 22, 2011; ISA/KR.

(Continued)

*Primary Examiner* — Andre Allen
(74) *Attorney, Agent, or Firm* — Harness, Dickey & Pierce, P.L.C.

(57) ABSTRACT

The present invention relates to a level gauge, and more particularly, to a level gauge provided on a device such as an engine or transmission of a vehicle to discharge aft from the device and prevent a foreign substance from being introduced therein. In addition, the level gauge and an oil net can be integrated into a single module, to thereby save costs.

5 Claims, 3 Drawing Sheets

(56) References Cited

FOREIGN PATENT DOCUMENTS

| | | | | |
|---|---|---|---|---|
| JP | 09-105659 A | | | 4/1997 |
| JP | 09166470 A | * | | 6/1997 |
| JP | 09-256832 A | | | 9/1997 |
| JP | 2000038913 A | * | | 2/2000 |
| JP | 2004019572 A | * | | 1/2004 |
| JP | 2009275519 A | * | | 11/2009 |
| KR | 10-1999-0021059 A | | | 3/1999 |
| KR | 10-2004-0022328 A | | | 3/2004 |
| KR | 10-2008-0059737 A | | | 7/2008 |

OTHER PUBLICATIONS

International Preliminary Report on Patentability (Chapter II) (in Korean) for PCT/KR2010/009400, dated Jan. 2, 2013; IPEA/KR.
VOLP60331PCTEP—Official Communication including European Search Report dated Jun. 3, 2014.
Office Action for Chinese Patent Application No. 201080070949.9 dated Feb. 17, 2015 (14 pages).

* cited by examiner

LEVEL GAUGE

CROSS-REFERENCE TO RELATED APPLICATIONS

This is a U.S. National Stage Application of International Application No. PCT/KR2010/009400, filed on Dec. 28, 2010 and published in Korean as WO 2012/091190 A1 on Jul. 5, 2012. The disclosures of the above applications are incorporated herein by reference.

FIELD OF THE INVENTION

The present invention relates to a level gauge. More particularly, the present invention relates to a level gauge that is disposed on a mechanical device such as an engine or a transmission of a vehicle so that air inside the engine is discharged, introduction of foreign substances into the engine is prevented, and the level gauge and an oil injection port can be integrated into a single module, thereby reducing the manufacturing costs.

BACKGROUND OF THE INVENTION

In general, a mechanical device such as an engine or a transmission of a machine (hereinafter, referred to as "vehicle") such as an automobile or a construction machine requires that oil should be supplied to a sliding part in order to perform a smooth operation of an operating part and maintain the lifespan of the operating part for a long period of time.

Viscosity and lubrication properties of the oil supplied to the engine of a vehicle are deteriorated over time due to oxidation by the contact between the oil and the air, abrasion of the sliding part, or the mixture of the oil and impurities introduced into the engine from the outside. Thus, a driver or an operator must check the state of the oil periodically to exchange the oil at the appropriate times.

FIG. 1 is a view showing the installation state of a conventional level gauge in accordance with the prior art, and FIG. 2 is a view showing the configuration of a conventional level gauge in accordance with the prior art.

Referring to FIGS. 1 and 2, the conventional level gauge includes a pipe (hereinafter, referred to as "tube") 30 made of a metal material that is mounted on a swing decelerator 10 of a vehicle and a gauge part 50 that is accommmodatably joined to the tube to measure the level of oil.

The gauge part 50 includes a hand grip 53, a sealing member 55, and an inspection part 57.

The hand grip 53 refers to a part that is gripped by an inspector's hand so that the inspector separates the gauge part 50 from the tube 30 to check the state of oil or couples the gauge part 50 to the tube 30. The sealing member 55 refers to an element that allows the gauge part 50 to be securely fixed to the tube 30 and simultaneously hermetically seals the tube 30. The inspection part 57 refers to an element that longitudinally extends inside an oil tank and allows for collection of an oil sample needed to check the state of the oil contained in the oil tank In the above configuration, the inspector pulls up the hand grip 53 to separate the gauge part 50 from the tube 30, and then identifies the state of the oil sample collected at a lower end of the inspection part 57 so that the inspector can check the state of the oil contained in the oil tank.

The gauge part 50 has concavo-convexes 56 formed on the outer circumferential surface of the sealing member 55 and the sealing member 55 is insertingly fitted into an upper end of the tube 30 in a press-fit manner.

However, the conventional level gauge entails a problem in that since the sealing member 55 is press-fittingly coupled to the tube, air inside the decelerator 10 is not easily discharged to the outside. In addition, the air inside the decelerator is expanded over time by heat generated in the operation process of the engine to cause the internal pressure of the engine to be increased, resulting in damage of a packing member or deterioration of operating efficiency of the machine.

Conventionally, in an attempt to solve such a problem, a discharge groove (not shown) is formed on the outer circumferential surface of the sealing member 55 in juxtaposition with the inner circumferential surface of the tube 30 so as to discharge the air heated to the outside through the discharge groove. However, such a conventional level gauge still encounters a problem in that foreign substances or moisture is introduced into the oil tank from the outside, resulting in deterioration of the quality of the oil and reduction of the lifespan of the machine.

DETAILED DESCRIPTION OF THE INVENTION

Technical Problems

Accordingly, the present invention was made to solve the aforementioned problem occurring in the prior art, and it is an object of the present invention to provide a level gauge for checking the state and amount of oil, in which an air hole is formed on an outer circumferential surface of a tube disposed on a mechanical device such as an engine or a transmission of a vehicle, and a hole shield is formed at the outside of the sealing member fitted into an upper end of the tube to seal an inlet of the tube and shield the air hole so that the air inside the engine can be smoothly discharged to the outside and external foreign substances can be prevented from being introduced into the engine, and in which the level gauge and an oil injection port can be integrated into a single module, thereby reducing the manufacturing costs.

Technical Solution

To accomplish the above object, in accordance with an embodiment of the present invention, there is provided a level gauge that comprises a tube disposed on an engine of a vehicle and a gauge part accommodatably joined to the tube and configured to check the state of oil contained in the engine, wherein the tube includes an air hole formed on an outer circumferential surface thereof so as to allow the air inside the engine to be discharged to the outside therethrough, and wherein the gauge part includes: a sealing member insertingly fitted into an upper end of the tube and configured to hermetically seal the tube; a hole shield formed integrally with the sealing member and fitted around an outer circumferential surface of the tube to shield the air hole; and an inspection part joined at one end thereof to one side of the sealing member and longitudinally extending at the other end thereof to the inside of an oil tank.

Advantageous Effect

The level gauge in accordance with an embodiment of the present invention as constructed above has the following advantages.

Air expanded due to high temperature in the inside of the engine is smoothly discharged to the outside, and external foreign substances is prevented from being introduced into the engine, thereby extending the lifespan of the oil and the machine. In addition, the level gauge and the oil injection port can be integrated into a single module, thereby reducing the manufacturing costs.

BRIEF DESCRIPTION OF THE INVENTION

The above objects, other features and advantages of the present invention will become more apparent by describing the preferred embodiments thereof with reference to the accompanying drawings, in which.

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 1:
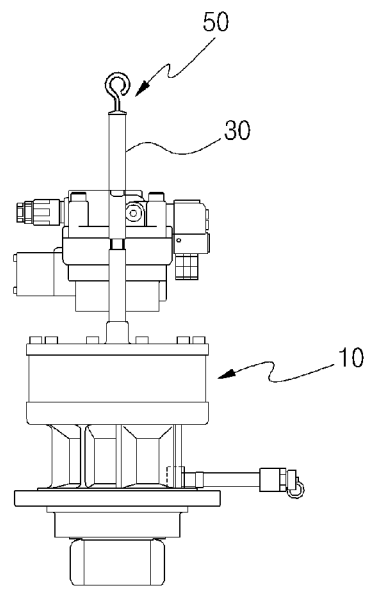
FIG. 1 is a view showing the installation state of a conventional level gauge in accordance with the prior art.
Figure 2:
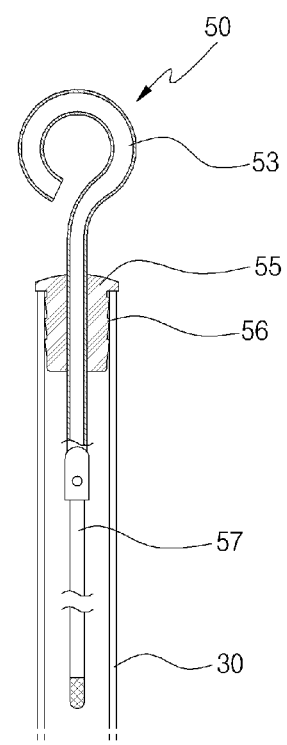
FIG. 2 is a view showing the configuration of a conventional level gauge in accordance with the prior art.
Figure 3:
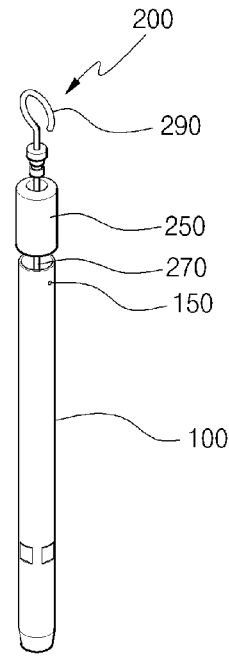
FIG. 3 is a perspective view showing the configuration of a level gauge in accordance with one embodiment of the present invention.
Figure 4:
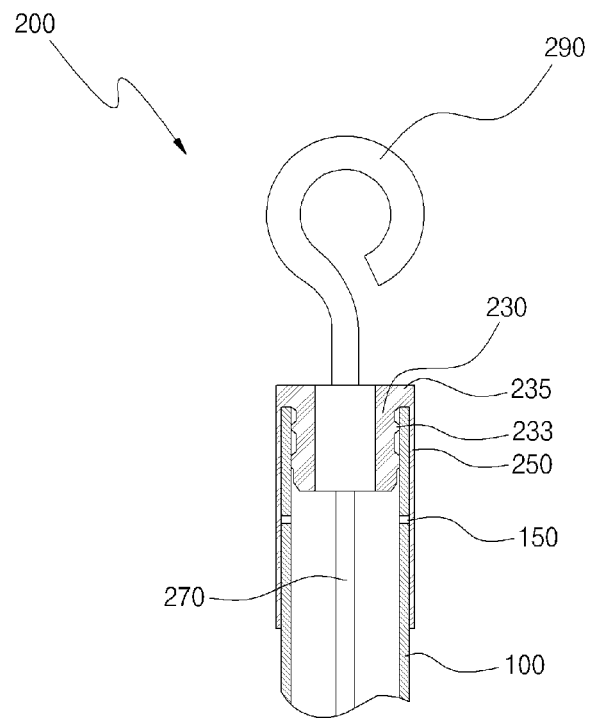
FIG. 4 is a cross-sectional view showing the configuration of a level gauge in accordance with one embodiment of the present invention.

FIG. 3 is a perspective view showing the configuration of a level gauge in accordance with one embodiment of the present invention, and FIG. 4 is a cross-sectional view showing the configuration of a level gauge in accordance with one embodiment of the present invention.

Referring to FIGS. 3 and 4, the level gauge according to the present invention includes a tube 100 disposed on an engine of a vehicle and a gauge part 200 accommodatably joined to an upper end of the tube 100 and configured to check the state of oil contained in the engine.

The tube 100 is an element having a pipe shape that is mounted on a swing decelerator. The gauge part 200 is fixedly joined to an upper end of the tube 100. The concrete shape of the tube and the state in which the tube is coupled to the engine are known in the art, and thus the detailed description thereof will be omitted to avoid redundancy.

The tube 100 includes at least one hole 150 formed on an outer circumferential surface of an upper portion thereof. When air inside the engine is thermally expanded, the air hole 150 allows air of the surplus volume to be discharged to the outside therethrough. The at least one air hole 150 is formed on the outer circumferential surface of the tube 100 at a position spaced apart by a predetermined distance from of the upper end of the tube 100, so that the air hole 150 is not shielded by the sealing member 230 when the sealing member 230 which will be described later is insertingly fitted into the tube 100. Thus, the air hole 150 is positioned at a position spaced apart from one side of the sealing member 230 in a state in which the sealing member 230 is insertingly fitted into the tube 100. That is, a distance between the upper end of the tube 100 and the air hole 150 is set to be at least larger than that between the upper end of the tube 100 and an end of one side of the sealing member 230. The sealing member will be described in detail later.

The gauge part 200 includes a sealing member 230 insertingly fitted into an upper end of the tube 100 to hermetically seal the tube 100, a hole shield 250 formed integrally with the sealing member 230 and fitted around an outer circumferential surface of the tube 100 to shield the air hole 150, an inspection part 270 joined at one end thereof to one side of the sealing member 230 and longitudinally extending at the other end thereof to the inside of an oil tank, and a hand grip 290 joined to the other side of the sealing member 230.

The sealing member 230 has a shape corresponding to that of a hollow portion formed on an inner circumferential surface of the tube 100. The sealing member 230 is inserted at one side thereof into the tube 100 and includes an extension portion 235 formed at the other side thereof.

Thus, the sealing member 230 is insertingly fitted into the tube 100, the extension portion 235 serves as a retaining step so that the sealing member 230 is prevented from being completely inserted into the tube 100. Generally, the tube 100 is formed in a cylindrical shape, and thus the sealing member 230 is also formed in a cylindrical shape corresponding to the shape of the tube 100.

The sealing member 230 is insertingly fitted into the upper end of the tube 100 in a press-fit manner. Thus, generally, a plurality of concavo-convexes 233 is formed on the outer circumferential surface of the sealing member 230 so that a frictional force between the contacts surfaces of the sealing member 230 and the tube 100 can be minimized to allow the sealing member 230 to be easily coupled to and separated from the tube 100. In addition, the outer diameter of abovementioned concavo-convexes 233 is set to be larger than the inner diameter of the tube 100 so that the sealing member 230 can be press-fittingly coupled to the tube 100 to firmly seal the tube 100.

The hole shield 250 is formed integrally with the sealing member 230 in such a manner as to have a cylindrical shape that is connected at one end thereof to the extension portion 235 of the sealing member 230 and downwardly extends at the other end thereof in juxtaposition with the outer circumferential surface of the sealing member 230. In this case, a distance between the outer circumferential surface of the sealing member 230 and the inner circumferential surface of the hole shield 250 is set to correspond to the thickness of the tube 100. Thus, when the sealing member 230 is coupled to the tube 100, the sealing member 230 is fitted into the tube 100 and the tube 100 is inserted between the sealing member 230 and the hole shield 250 while the hole shield 350 shields the air hole 150 formed on the outer circumferential surface of the tube 100.

The inspection part 270 is formed in a bar or cable shape that is joined at one end thereof to one side of the sealing member 230 and longitudinally extends at the other end thereof to the inside of an oil tank. The other end of the inspection part 270 is provided with a scale indicating a maximum point and a minimum point. The other end of inspection part 270 is partially submerged in oil contained in the engine when the sealing member 230 is coupled to the tube 100. Thus, an inspector can remove the gauge par 200 from the tube 100 and observe the state of the oil to check the amount, the viscosity, etc., of the oil. That is, if the level of the oil adhered to the other end of the inspection part 270 is below the minimum point of the scale, the oil must be replenished. If the level of the oil adhering to the other end of the inspection part 270 approximates the minimum point of the scale, this means that the amount of the oil is sufficient. Further, if the oil sticking to the inspection part 270 is excessively discolored or the viscosity of the oil is degraded, the oil is replaced with new one. The inspection part 270 is an element that is known in the art, and thus the detailed description thereof will be omitted to avoid redundancy.

In the meantime, the gauge part 200 includes a hand grip 290 joined to the other side of the sealing member 230 so that a user can easily separate the gauge part 200 from the tube 100. The hand grip 290 is generally formed in a loop or ring shape, but is not always limited thereto. The hand grip 290 may have any well-known various shapes that can be easily pulled up by a user's hand.

Figure 5:
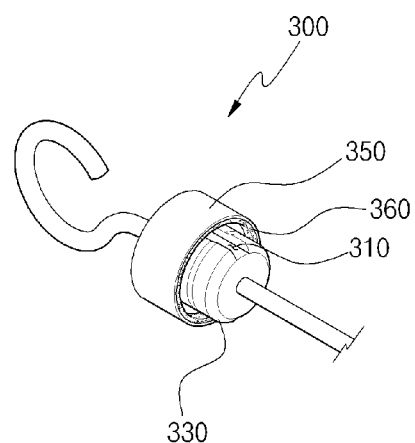

FIG. 5 is a perspective view showing the configuration of a gauge part of a level gauge in accordance with another embodiment of the present invention, and FIG. 4 is a cross-sectional view showing the configuration of a level gauge in accordance with another embodiment of the present invention.

Figure 6:
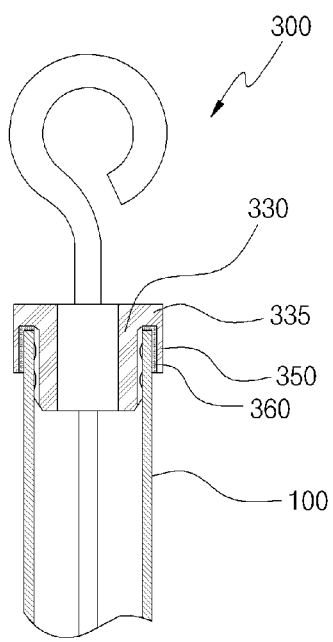

Referring to FIGS. 5 and 6, the level gauge in accordance with another embodiment of the present invention includes a tube 100 disposed on an engine of a vehicle and a gauge part 300 accommodatably joined to the tube 100 and configured to check the state of oil contained in the engine. The gauge part 300 includes: a sealing member 330 insertingly fitted into an upper end of the tube 100 and configured to hermetically seal the tube 100, the sealing member 230 including an extension portion 335 formed at one side thereof; a discharge groove 310 longitudinally formed extending from an end of the other side of the sealing member 230 to the extension portion 335 formed at the one side of the sealing member 230; a shield 350 formed integrally with the sealing member 330 in such a manner as to be spaced apart from an outer circumferential surface of the tube 100; and a filling member 360 disposed on the inner circumferential surface of the shield and configured to fill a space defined between the tube 100 and the shield 350.

The discharge groove 310 is formed longitudinally along the outer circumferential surface of the sealing member 330. In this case, the discharge groove 310 extends from an end of the other side of the sealing member 230 to the extension portion 235 formed at the one side of the sealing member 230.

The shield 350 has a cylindrical shape that is formed integrally with the extension portion 335 of the sealing member 230 to surround the outer circumferential surface of the upper portion of the tube 100. In this case, the inner circumferential surface of the shield 350 is not brought into close contact with the outer circumferential surface of the tube 100 but is formed spaced apart by a predetermined distance from the outer circumferential surface of the tube 100.

The filling member 360 is disposed on the inner circumferential surface of the shield and serves to fill a space defined between the tube 100 and the shield 350. In this case, the filling member 360 is made of a porous material having a fine pore size, such as sponge or cork so that leakage of the oil contained in the engine or introduction of external foreign substances into the engine can be prevented and simultaneously the air expanded in the engine can be discharged to the outside. The filling member 360 may be disposed between an upper end of the tube 100 and the extension portion 335 depending on the needs. The filling member 360 made of the porous material may use known various materials, and thus the detailed description thereof will be omitted to avoid redundancy.

The constitution of the gauge part of the level gauge in accordance with another embodiment of the present invention are the same as that of the gauge part of the level gauge described in FIGS. 3 and 4 except the discharge groove 310, the shield 350, and the filling member 360. In addition, the constitution of the tube 100 of the level gauge in accordance with another embodiment of the present invention is the same as that of the tube described in FIGS. 3 and 4 except that the tube 100 does not include the air hole formed thereon. Thus, the description of the constitution of the gauge part and the tube, which is the same as that described in FIGS. 3 and 4 will be omitted.

In the above constitution, the level gauge in accordance with another embodiment of the present invention allows the air expanded in the engine to be moved to the extension portion 335 of the sealing member 330 along the discharge groove 310 and then discharged to the outside while passing through the filling member 360. In this case, the filling member 360 made of a porous material having a fine pore size allows a gaseous material such as air to easily permeate therethrough when a predetermined pressure is reached, but does not allow liquid or solid foreign substances to permeate therethrough.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

INDUSTRIAL APPLICABILITY

As described above, the present invention relates to a level gauge, and is applied to the manufacture of a level gauge that is disposed on a mechanical device such as an engine or a transmission of a vehicle so that air inside the engine is discharged, introduction of foreign substances into the engine is prevented, and the level gauge and an oil injection port can be integrated into a single module, thereby reducing the manufacturing costs.

The invention claimed is:

1. A level gauge that comprises a tube disposed on an engine of a vehicle and a gauge part accommodatably joined to the tube and configured to check the state of oil contained in the engine, wherein the tube comprises an air hole formed on an outer circumferential surface thereof so as to allow the air inside the engine to be discharged to the outside therethrough, and wherein the gauge part comprises: a sealing member insertingly fitted into an upper end of the tube and configured to hermetically seal the tube; a hole shield formed integrally with the sealing member and fitted around an outer circumferential surface of the tube to shield the air hole; and an inspection part joined at one end thereof to one side of the sealing member and longitudinally extending at the other end thereof to the inside of an oil tank;

wherein the sealing member has a shape corresponding to that of a hollow portion formed on an inner circumferential surface of the tube and comprises an extension portion formed at the other side thereof;

the air hole is formed on the outer circumferential surface of the tube at a position spaced apart from the one side of the sealing member fitted into the tube so that the air hole is not shielded by the sealing member when the sealing member is insertingly fitted into the tube; and the hole shield is formed integrally with the sealing member in such a manner as to have a cylindrical shape that is connected at one end thereof to the extension portion of the sealing member and downwardly extends at the other end thereof in juxtaposition with the outer circumferential surface of the sealing member, so that the hole shield shields the air hole when the sealing member is insertingly fitted into the tube.

2. The level gauge according to claim 1, wherein the gauge part further comprises a hand grip joined to the other side of the sealing member.

3. The level gauge according to claim 1, wherein the tube comprises at least one air hole formed on the outer circumferential surface thereof.

4. The level gauge according to claim 1, wherein the gauge part further comprises a hand grip joined to the other side of the sealing member.

5. The level gauge according to claim 1, wherein the tube comprises at least one air hole formed on the outer circumferential surface thereof.

* * * * *